United States Patent [19]

Kobayashi et al.

[11] 4,303,619

[45] Dec. 1, 1981

[54] APPARATUS FOR CONTINUOUSLY PRODUCING POTASSIUM SULFATE

[75] Inventors: Kazuo Kobayashi, Chibashi; Heima Hirai, Sagamiharashi, both of Japan

[73] Assignee: Chisso Corporation, Osaka, Japan

[21] Appl. No.: 166,323

[22] Filed: Jul. 7, 1980

[51] Int. Cl.³ .............................................. F28G 3/10
[52] U.S. Cl. .................................. 422/205; 366/149; 366/309; 422/210; 422/225; 423/552
[58] Field of Search ............... 422/205, 210, 224, 228, 422/225; 423/551, 552; 366/149, 261, 279, 309

[56] References Cited

U.S. PATENT DOCUMENTS

| | | | |
|---|---|---|---|
| 2,623,737 | 12/1952 | McEachran | 422/210 X |
| 3,256,066 | 6/1966 | Higgins | 422/205 X |
| 3,473,896 | 10/1969 | Halder et al. | 422/205 |
| 3,495,951 | 2/1970 | Tanaka et al. | 422/210 X |
| 3,592,609 | 7/1971 | Honbo | 422/205 |
| 3,635,682 | 1/1972 | Vine et al. | 422/205 X |
| 3,782,901 | 1/1974 | Whetstone | 422/205 |

FOREIGN PATENT DOCUMENTS 352264  3/1960  Japan .................................. 422/205

*Primary Examiner*—Richard L. Chiesa
*Attorney, Agent, or Firm*—Fred Philpitt

[57] ABSTRACT

An improved apparatus for producing potassium sulfate and hydrogen chloride gas from potassium hydrogen sulfate and potassium chloride is provided, which comprises a horizontal type muffle furnace having an arcuate upper wall, at least one shaft of an agitator, a means for feeding raw materials, and a means for discharging the reaction product, to discharge the product by overflow; and an outer casing for said muffle furnace in which said furnace is accomodated on a bed of an insulating material and a space over said furnace, as a passage for heating gas. A heating gas introduced into said space over said furnace supplies the heat quantity required for the total reaction, through the upper wall of the furnace to raw materials. According to this apparatus, the life of furnace for continuous operation can be prolonged.

1 Claim, 2 Drawing Figures

APPARATUS FOR CONTINUOUSLY PRODUCING POTASSIUM SULFATE

BACKGROUND OF THE INVENTION

1. Field of the Invention

This invention relates to an apparatus for continuously producing potassium sulfate. More particularly, it relates to an apparatus for continuously producing potassium sulfate and hydrogen chloride gas by reacting potassium hydrogen sulfate with potassium chloride.

2. Description of the Prior Art

An apparatus for continuously producing an alkali metal sulfate and hydrogen chloride gas by reacting an alkali metal chloride with sulfuric acid and/or an alkali metal hydrogen sulfate is disclosed in Japanese patent publication No. 2264/1960. This apparatus overcame the drawbacks of insufficient agitation and insufficient heat transfer of the Mannheim furnace of the vertical type employed heretofore for such a kind of reaction, by employing a horizontal type arcuate muffle furnace whereby the production capacity per unit wall surface of the heat transfer furnace was increased with an increase of 3 to 4 times that of the above-mentioned Mannheim furnace. However, the above-mentioned invention of Japanese patent publication No. 2264/1960 (which will be hereinafter referred to as prior invention) had the following four drawbacks:

1. Since the contents in the tubular furnace are heated from the total circumferential directions of the tubular furnace, the furnace material at the lower half part of the furnace where the molten reaction mixture is in close contact with the furnace is liable to be corroded.

2. Since the upper half part of the tubular furnace is different from the lower half part thereof in the heat conductive quantity per unit area, cracks of the furnace material are liable to form at the upper half part of the furnace.

3. Since heating is concentrated on the corresponding part to the initial reaction zone on the inlet side of the tubular furnace where raw materials are fed, the difference between the temperature of the inside of the furnace at that part and that of the outer casing of the furnace is much larger than the difference between the inner and outer temperatures of the furnace on the discharge side of product. Thus, cracks are liable to form at the middle part of the tubular furnace in the axial direction thereof.

4. Since the reaction mixture is much different in the composition between in the vicinity of the inlet where raw materials are fed and in the vicinity of the discharge part of product, if the retention time of the reaction mixture is made shorter than a certain critical time, the conversion decreases rapidly.

Thus, in the case of the tubular muffle furnace of the prior invention, cracks formed in the tubular furnace after continuous operation for one to several months, at a reaction temperature of 200° to 450° C., even when only a mixture of potassium hydrogen sulfate with potassium chloride was reacted together (note: no sulfuric acid is added at this step). As a result, disassemblying and repair of the whole of the tubular furnace have been required. In view of the above-mentioned drawbacks of the prior invention, the present inventors have made strenuous studies, and as a result have completed the invention of an apparatus capable of continuously producing potassium sulfate and concentrated hydrogen chloride for a long time and with a high efficiency.

SUMMARY OF THE INVENTION

As is apparent from the foregoing description, the first object of the present invention is to provide an apparatus for producing potassium sulfate wherein the heat transfer part of the tubular furnace has a longer life; the second object is to provide an apparatus for producing potassium sulfate continuously and efficiently at a short retention time of the reaction mixture; and other objects will become apparent from the following description.

The present invention resides in:

1. An apparatus for producing potassium sulfate and hydrogen chloride gas from potassium hydrogen sulfate and potassium chloride, comprising:
   (a) a horizontal type muffle furnace having an arcuate heat-conductive upper wall, said furnace having
      (i) at least one powerful agitator shaft which is equipped with agitating blades and admixes a reaction mixture therein rapidly by agitating and turning over said mixture so as to prevent it from adhering to the bottom thereof,
      (ii) a raw material feeder placed on one side wall of said furnace,
      (iii) a reaction product-discharging means placed on the other side wall opposite to the side of the raw material feeder, and
      (iv) an exit port for hydrogen chloride gas generated; and
   (b) an outer casing containing said muffle furnace, in which said furnace is supported on a bed of an insulating material and a space over said furnace forms a passage for heating gas which provides the heat quantity necessary to complete the total reaction, said space over said furnace having an inlet port for said heating gas and an outlet port for exhaust gas after heating.

2. An apparatus according to the above item 1 wherein a drop arch type partition wall is provided in the vicinity of said outlet port for exhaust gas.

3. An apparatus to the above item 1 or 2 wherein said raw material-feeder penetrates said one side wall of the furnace and extends toward the inside of the furnace and has its opening at an intermediate part between the part at which it penetrates the wall and the central part of the inside of the furnace.

4. An apparatus according to any one of the above item 1, 2 or 3 wherein said reaction product-discharging means is provided on a level higher than that of the axial center of said at least one agitator shaft.

5. An apparatus according to the above item 1 wherein among said agitating blades, the closest one to the inner wall surface of the furnace, onto which said reaction product-discharging means is fixed, is brought into close contact with said inner wall surface so as to be able to scrape the reaction mixture off the wall surface.

DETAILED DESCRIPTION OF THE INVENTION

The constitution and effectiveness of the present invention will be illustrated referring to the accompanying drawings.

In these two figures, numberal 1 shows a horizontal, cylindrical muffle furnace having arcuate upper wall.

Figure 1:
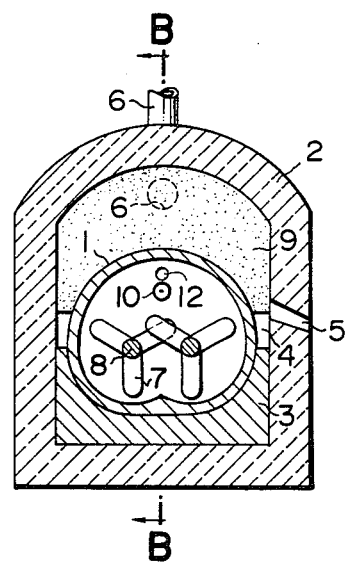
FIG. 1 shows a view of the lateral cross-section taken along A—A line of FIG. 2, of an apparatus for continuous production, having a muffle furnace of semi-cylindrical and horizontal type.
Figure 2:
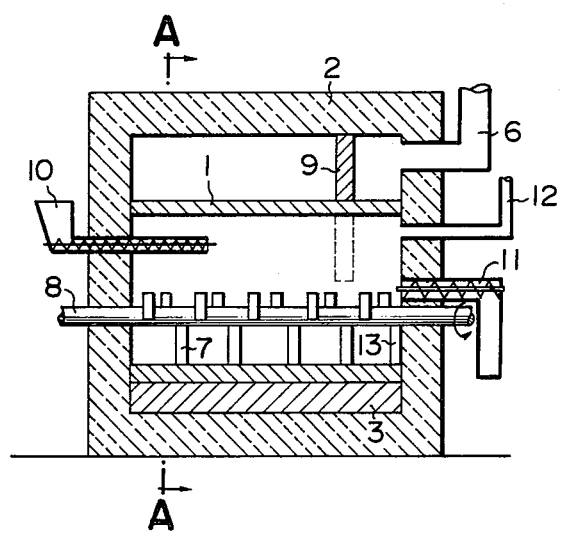
FIG. 2 shows a view of the longitudinal cross-section taken along B—B line of FIG. 1, of the apparatus.

This furnace has a cross-section consisting of a combination of one to several arcs, and a suitable length in the axial direction thereof (e.g. 2 to 5 m), designed so as to bring efficient stirring and mixing and heat transfer, and the part corresponding to the bottom of the furnace has such a form that the reaction mixture can be easily stirred and mixed so as not to be adhered onto the bottom of the furnace, and temperature maintenance and heat transfer can be effectively carried out. The arcuate upper wall referred to herein means the form of a part of the muffle furnace where heating is carried out, while the whole of the furnace is cylindrical. Although the cross-sectional form of the muffle furnace of the present invention in the axial direction thereof is not limited to a specified form, a circular form, an elliptical form, an oval form, a special form having one larger arc and two smaller arcs combined together, as shown in FIG. 1, etc. may be suitable.

In both the drawings, numeral 2 shows an outer casing for encasing the muffle furnace 1. In this outer casing 2 are provided a port 5 for feeding a high temperature heating gas at such a location that the heat quantity necessary for the total reaction can be supplied through the port onto the total heating surface as uniformly as possible, and a heat insulating part 3 capable of effectively heat-insulating the reaction materials inside the muffle furnace, heated by the heating high temperature gas, and at the same time serving as a supporting bed for the muffle furnace 1. Further, in the outer casing 2 are also provided a port 6 for discharging the heating gas, and a drop arch 9 (a partition wall) for preventing the gas from being discharged in short-circuit manner, which drop arch has a passageway 4 at the lower part thereof. Further, similar drop arches having alternately an upper passageway or a lower one may be provided inside the outer casing 2. In addition, the location and the number of the port 5 for supplying the heating gas are not limited to those as shown in the drawings. Numeral 10 shows a means for continuously feeding raw materials, which means penetrates through the furnace wall common to the wall of the outer casing 2, extends toward the center of the furnace and has an opening at its end. Numeral 11 shows a means for discharging the reaction product, which means penetrates through the furnace wall common to the wall of the outer casing 2 on the opposite side to that of the means 10 for feeding raw materials, and is on a level higher than the axial center of a shaft or shafts of agitator as mentioned below. Inside the muffle furnace 1 is provided at least one shaft of agitator 8 onto which agitating elements or blades 7 of paddle form, screw form, ribbon form, rod form or the like, in contact with the bottom of the furnace are fixed so that the reaction mixture (molten mixture) can be powerfully agitated and mixed by turning-over-action so as not to be adhered onto the furnace bottom, and also the reaction materials can be continuously moved toward the discharging means 11, and the shaft is driven and rotated by a power transmitted from the outside of the furnace by the medium of gear, chain, reduction unit or the like. As for the shaft(s) of agitator 8 having agitating elements 7 fixed thereonto, it is necessary to provide e.g. 1 to 5 shafts, preferably 2 or 3 shafts, depending on the shape, size and treating capacity of the muffle furnace of the present invention. Further, the radius of rotation of the agitator(s) is adapted to the arc of the lower half part of the muffle furnace so that the tip ends of the agitating elements or blades can slide on the surface of the arc, whereby the adhesion of the reaction mixture onto the surface can be prevented. In case where two or more shafts of agitator are provided, it is necessary to determine the distance between the centers of the respective shafts of agitator, so that the agitating elements fixed onto the respective shafts of agitators can be interposed to each other to vigorously knead the reaction mixture. Further, among the above-mentioned agitating elements, the closest one 13 to the inner wall surface of the furnace onto which the above-mentioned means 11 for discharging the reaction product is fixed, can be so constructed that it is brought into close contact with the above-mentioned wall surface so as to scrape the reaction mixture off the wall surface. This is a preferable function for these elements.

It is not necessary for the agitator(s), unlike the prior invention, to impart a particularly strong agitating power to the part where raw materials are fed (the exit part of the means 10 for feeding raw materials), but a moderate agitating power may be sufficient; hence the shape and the number of the agitating elements fixed there, may be the same as those at other parts.

The number of revolution of the agitating elements is 0.5 to 10 RPM, preferably 1 to 5 RPM although it is varied depending on the size of the furnace and the shape or the number of the agitating elements. Numeral 12 shows a pipe for discharging hydrogen chloride gas.

In the production of potassium sulfate employing the continuous production apparatus designed as mentioned above, first a mixture of necessary amounts of potassium hydrogen sulfate and potassium chloride (prepared by mixing and reacting 2 mols of potassium chloride with one mol of sulfuric acid at 200° C. or lower, particularly 100° C. or lower) is continuously introduced through the means 10 for feeding raw materials, into the muffle furnace 1 at an intermediate part between the inlet end and the central part inside the muffle furnace while the agitator(s) inside the muffle furnace are rotated at e.g. 1 R.P.M. During the course where freshly fed raw materials are dispersed in and mixed with the already formed reaction mixture, to form a uniform material, chemically the resulting material is converted into potassium sulfate and hydrogen chloride, and mechanically a visibly sufficient mixing is effected by entaglement of its flow toward the exit end with its reverse flow toward the inlet end; hence it does not occur that the most part of the total reaction is concentrated on a definite reaction zone, as in the case of the prior invention. Now, for feeding a heat quantity required for the total reaction to the raw material mixture inside the muffle furnace through the wall of the furnace, for example, a heating mixed gas or a fuel such as heavy oil, LPG, etc. at 1100° to 1200° C. subjected to jet-combustion is introduced through a feeding port 5. When the above-mentioned raw material mixture is powerfully, rapidly and reversibly agitated and mixed by the above-mentioned agitator(s), the raw material mixture inside the furnace is maintained at a temperature of 300° to 400° C. by the heat transferred through the furnace wall of the muffle furnace 1, and 96 to 98% of the total reaction is easily effexted. Further, hydrogen chloride gas evolved with the progress of the reaction is continuously taken out through a discharging pipe 12. Further, the gas used for heating the muffle furnace is discharged through a discharging port 6.

According to the production apparatus of the present invention, it is unnecessary to elevate the temperature of the mixture in the vicinity of the discharging port of product to that as high as 400° to 450° C., as in the prior invention, since it is unnecessary in respect of the quality standards of product to complete the conversion (practically about 99%), as in the case of the prior invention. Thus, the part where the reaction of the raw material mixture substantially proceeds is extended to the whole inside the furnace. As a result, the retention time is ⅓ or less of that in the case of the apparatuses of the prior invention having a tubular furnace of almost the same shape and size, excluding the principal part. However, for attaining this effectiveness, it is necessary that the port through which raw materials are fed be located as described in the above-mentioned item (3); the means for discharging the reaction product be located as described in the above-mentioned item (4); and the product be discharged through the discharge port by overflow. Thus, if an apparatus having a structure different in either one or both of the requirements (3) and (4) is employed, the above-mentioned effectiveness of the present invention cannot be obtained.

Further, the reason that when not the structure of tubular furnace of the prior invention, but the arc form structure on the upper surface, of the present invention is employed, it is possible to supply the total heat qauntity required for the reaction, and also there occurs no adhesion of the reaction materials onto the bottom of the furnace during the operation, is presumed to consist in that since the conversion of potassium sulfate produced employing the apparatus of the present invention, is restricted to 96 to 98%, a small amount of the melt of potassium hydrogen sulfate functions as a heat medium in the raw material mixture.

Further, presumably since the temperature of the raw material mixture is 300° to 400° C. which is 100° to 50° C. lower than that at the higher temperature part (400° to 450° C.) of the prior invention, and no heat is applied from the outer casing to the lower half part inside the furnace, such superior results are obtained that the life of the furnace through its continuous operation in the case of the apparatus of the present invention is one to two years and very often longer than one and half year, whereas according to the operational results of the apparatus of the prior invention, the life is in the rnage of one year to 6 months and yet the exact estimate is difficult.

What is claimed is:

1. An apparatus for the production of potassium sulfate and hydrogen chloride gas from potassium hydrogen sulfate and potassium chloride, comprising:
   (a) an elongated horizontal type muffle furnace having an arcuate heat-conductive upper wall, said furnace having (i) at least one elongated and horizontally disposed agitator shaft which is equipped with agitating blades that are adapted to admix the reaction mixture therein rapidly by agitating and turning over said mixture so as to prevent it from adhering to the bottom of the furnace,
      (ii) a raw material feeder located in a first end wall of said elongated furnace, said raw material-feeder extending inwardly into the furnace to a point which is located between the longitudinal center of the furnace and said first end wall,
      (iii) a reaction product-discharging means located in a second end wall that is opposite from said first end wall, said reaction product-discharging means being located on a level higher than that of the axial center of said at least one agitator shaft,
      (iv) an exit port in the furnace for the removal of hydrogen chloride gas generated,
      (v) the agitating blade closest to the wall surface of the furnace which contains said reaction product-discharging means being positioned in close contact with said inner wall surface so as to be able to scrape the reaction mixture off said wall surface, and
   (b) an outer casing surrounding said muffle furnace, in which casing said furnace is supported on a bed of an insulating material and the casing is spaced away from the top of the furnace to thereby form a passage for heating gas which provides the amount of heat necessary to complete the total reaction, said heating space over said furnace having an inlet port for introducing heating gas and an outlet port for the removal of heating gas, a drop arch type partititon wall being provided in the vicinity of said outlet port for exhaust gas.

* * * * *

UNITED STATES PATENT AND TRADEMARK OFFICE
CERTIFICATE OF CORRECTION

PATENT NO. : 4,303,619

DATED : December 1, 1981

INVENTOR(S) : KAZUO KOBAYASHI et al

It is certified that error appears in the above—identified patent and that said Letters Patent is hereby corrected as shown below:

On the cover page please insert Item

-- [30] Foreign Application Priority Data
July 19, 1979 [JP] Japan 54-91812 --

Signed and Sealed this

*Ninth* Day of *February 1982*

[SEAL]

*Attest:*

GERALD J. MOSSINGHOFF

*Attesting Officer*     *Commissioner of Patents and Trademarks*